United States Patent
Eslambolchi et al.

(10) Patent No.: US 11,611,611 B2
(45) Date of Patent: *Mar. 21, 2023

(54) SYSTEM AND METHOD FOR EVENT DRIVEN PUBLISH-SUBSCRIBE COMMUNICATIONS

(71) Applicant: AT&T Intellectual Property II, L.P., Atlanta, GA (US)

(72) Inventors: Hossein Eslambolchi, San Diego, CA (US); John R. McCanuel, Bailey, CO (US); Prakash Vasa, Clarksburg, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 87 days.

This patent is subject to a terminal disclaimer.

(21) Appl. No.: 17/189,212

(22) Filed: Mar. 1, 2021

(65) Prior Publication Data

US 2021/0185118 A1    Jun. 17, 2021

Related U.S. Application Data

(63) Continuation of application No. 16/113,376, filed on Aug. 27, 2018, now Pat. No. 10,938,887, which is a
(Continued)

(51) Int. Cl.
*G06F 16/21* (2019.01)
*H04L 67/10* (2022.01)
(Continued)

(52) U.S. Cl.
CPC .......... *H04L 67/10* (2013.01); *H04L 63/0281* (2013.01); *H04L 63/08* (2013.01);
(Continued)

(58) Field of Classification Search
CPC ..... H04L 67/10; H04L 63/0281; H04L 63/08; H04L 63/0884; H04L 63/10; H04L 67/51;
(Continued)

(56) References Cited

U.S. PATENT DOCUMENTS 6,021,443 A    2/2000   Bracho et al.
6,185,613 B1   2/2001   Lawson et al.
(Continued)

FOREIGN PATENT DOCUMENTS

WO    02079984 A1    10/2002

OTHER PUBLICATIONS

Registering for Receiving Event Assigning Priority to Receive Complex Network Domains, Aug. 7, 2016.
(Continued)

*Primary Examiner* — Etienne P Leroux
*Assistant Examiner* — Cindy Nguyen

(57) ABSTRACT

A system and method for delivering an event from an event publisher to an event subscriber via an event broker are disclosed. The event broker performs several functions such as receiving an event published by an event publisher of a first domain, assigning a priority based on a second domain to a plurality of subscribers of the second domain, processing the event based on a rule and the priority, and further delivering the event published by the event publisher of the first domain to the plurality of event subscribers of the second domain in accordance with the priority.

20 Claims, 2 Drawing Sheets

Related U.S. Application Data continuation of application No. 14/601,880, filed on Jan. 21, 2015, now Pat. No. 10,063,627, which is a continuation of application No. 13/101,656, filed on May 5, 2011, now Pat. No. 8,972,451, which is a continuation of application No. 11/213,062, filed on Aug. 26, 2005, now Pat. No. 7,941,448.

(51) Int. Cl.
  *H04L 9/40* (2022.01)
  *H04L 67/51* (2022.01)
  *H04L 67/55* (2022.01)
  *H04L 67/561* (2022.01)
  *H04L 67/564* (2022.01)

(52) U.S. Cl.
  CPC .......... *H04L 63/0884* (2013.01); *H04L 63/10* (2013.01); *H04L 67/51* (2022.05); *H04L 67/55* (2022.05); *H04L 67/561* (2022.05); *H04L 67/564* (2022.05)

(58) Field of Classification Search
  CPC ..... H04L 67/55; H04L 67/561; H04L 67/564; G06F 16/213; G06F 16/3331; G06F 16/211
  See application file for complete search history.

(56) References Cited

U.S. PATENT DOCUMENTS

| | | | |
|---|---|---|---|
| 6,545,987 B1 | 4/2003 | Becher | |
| 6,704,785 B1 | 3/2004 | Koo et al. | |
| 6,728,715 B1 | 4/2004 | Astley et al. | |
| 6,748,455 B1 | 6/2004 | Hinson et al. | |
| 6,829,770 B1 | 12/2004 | Hinson et al. | |
| 6,843,415 B2 | 1/2005 | Vogler | |
| 6,901,447 B2 | 5/2005 | Koo et al. | |
| 6,910,070 B1 | 6/2005 | Mishra et al. | |
| 6,918,084 B1 | 7/2005 | Slaughter et al. | |
| 7,216,181 B1 | 5/2007 | Jannu et al. | |
| 7,266,726 B1 | 9/2007 | Ladd et al. | |
| 7,454,462 B2 | 11/2008 | Belfiore et al. | |
| 7,543,301 B2 | 6/2009 | Monnie et al. | |
| 7,725,590 B2 | 5/2010 | Sedukhin | |
| 7,765,557 B2 | 7/2010 | Young | |
| 2002/0188688 A1 | 12/2002 | Bice et al. | |
| 2003/0041139 A1 | 2/2003 | Beadles | |
| 2003/0097482 A1 | 5/2003 | DeHart et al. | |
| 2003/0097485 A1 | 5/2003 | Horvitz et al. | |
| 2003/0126181 A1 | 7/2003 | Young | |
| 2004/0001498 A1 | 1/2004 | Chen et al. | |
| 2004/0030627 A1 | 2/2004 | Sedukhin | |
| 2004/0060627 A1 | 4/2004 | Davis | |
| 2004/0068481 A1 | 4/2004 | Seshadri et al. | |
| 2004/0128393 A1 | 7/2004 | Blakley et al. | |
| 2004/0250262 A1 | 12/2004 | Irassar et al. | |
| 2005/0021622 A1 | 1/2005 | Cullen | |
| 2005/0044197 A1 | 2/2005 | Lai | |
| 2005/0097317 A1 | 5/2005 | Trostle et al. | |
| 2005/0204054 A1 | 9/2005 | Wang et al. | |
| 2005/0289384 A1 | 12/2005 | Kehl | |
| 2006/0031018 A1 | 2/2006 | Bush et al. | |
| 2006/0047665 A1 | 3/2006 | Neil | |
| 2006/0200444 A1 | 9/2006 | Bracho et al. | |
| 2006/0233180 A1 | 10/2006 | Serghi et al. | |

OTHER PUBLICATIONS

Publish-subscribe Domains Modifying Event Format Priority Receiving, Dec. 6, 2016.

Authentication XML Schema Publish-Subscribe, Sep. 30, 2017.

XML Schema Validation Authentication Subscriber's Domain, Apr. 19, 2018.

Edwards et al. "Model-Driven Configuration and Deployment of Component Middleware Publish/Subscribe Services," @ Springer-Verlag Berlin Heidelberg, 2004.

Harrison et al., "The Design and Performance of a Real-Time CORBA Event Service," Department of Computer Science, Washington Univeristy, Nov. 19, 1998.

SYSTEM AND METHOD FOR EVENT DRIVEN PUBLISH-SUBSCRIBE COMMUNICATIONS

CROSS REFERENCE TO RELATED APPLICATIONS

This application is a continuation of U.S. patent application Ser. No. 16/113,376, filed Aug. 27, 2018, (now U.S. Pat. No. 10,938,887) which is a continuation of U.S. patent application Ser. No. 14/601,880, filed Jan. 21, 2015, (now U.S. Pat. No. 10,063,627) which is a continuation of U.S. patent application Ser. No. 13/101,656, filed May 5, 2011, (now U.S. Pat. No. 8,972,451) which is a continuation of U.S. patent application Ser. No. 11/213,062, filed Aug. 26, 2005, (now U.S. Pat. No. 7,941,448) all of which are incorporated herein by reference in their entirety.

BACKGROUND

Field

The disclosed embodiments are related to an event driven communication mechanism, and more particularly to eventing mechanism for communication between any device, person, and system.

Related Art

Software platforms traditionally offered a publish/subscribe mechanism as one of the core platform services. With help from this mechanism, an application could raise events or express interest in events produced by other applications. The Internet and Web services are emerging as the next generation platform for distributed applications.

Typically, publish/subscribe service is well known in the art. It includes an event broker or an event intermediary. From the point of view of the event broker, the world is divided into two types of entities event publishers and event subscribers. Event publishers advertise event types and raise events by sending messages to the event broker. Event subscribers express interest in events by registering event subscriptions with the event broker. The event broker matches the two parties by forwarding events sent by the publishers to endpoint registered by the subscribers.

The Event-driven, or Notification-based, interaction pattern is a commonly used pattern for inter-object communications. Examples exist in many domains, for example in publish/subscribe systems provided by Message Oriented Middleware vendors, or in system and device management domains. This notification pattern is increasingly being used in a Web services context.

The Event-driven communications are very useful and attractive for many purposes, especially in situations where timely information dissemination is required, where notice of changes or status must constantly occur, where real time information monitoring is required. Event-driven communications also offer an advantage of reducing traffic below the level typically required by resource-based or demand-driven communication systems. Another advantage of publish-subscribe communication systems is that they function with both multiple subscribers and multiple publishers.

Publish-subscribe communications are asynchronous and thus allow a publisher or a subscriber to be on-line as it desires. Thus, a failure of equipment used by a subscriber has no effect on the service. The publication by a publisher simply continues, and other subscribers desiring to do so remain on line with no indication that any other subscriber has left. This emphasizes another great advantage of a publish-subscribe communications service, the manner in which the individual publishers and subscribers are decoupled from one another. In theory, apart from system administrators, no publisher or subscriber need know that any other publisher or subscriber is publishing or receiving data on any publication channel.

Because of these and other advantages, much work has been done to implement event-driven communications utilizing the various data access protocols which exist to facilitate the transfer of data between disparate systems. However, none of the publish-subscribe or event-driven mechanisms in the industry are fully compliant with standards such as with J2EE, Web Services eventing definitions available in the industry.

SUMMARY

In accordance with an embodiment, a method of providing publish-subscribe communications is disclosed. An event broker receives an event published by an event publisher of a first domain. A priority is assigned based on a second domain to a plurality of subscribers of the second domain. The event is processed based on a rule and the priority. Lastly, the event published by the event publisher of the first domain is delivered to the plurality of event subscribers of the second domain in accordance with the priority.

In accordance with an embodiment, a publish-subscribe communication system is disclosed. The system includes an event broker that is configured to receive an event published by an event publisher of a first domain, assign a priority based on a second domain to a plurality of subscribers of the second domain, process the event based on a rule and the priority, and deliver the event published by the event publisher of the first domain to the plurality of subscribers of the second domain in accordance with the priority.

DETAILED DESCRIPTION

The following terms are used throughout this application:
Event
An event is any created content or a change in the content of a resource or request for processing.
Event Publisher
An event publisher is an entity which generates or publishes events.
Event Subscriber
An event subscriber is a receiver of events.
Event Broker
An event broker is an entity which routes events. Brokers typically aggregate and publish events from other publishers and forward them to the subscribers. An event broker can also apply some transformation to the events it processes.
Notification
A notification is an XML element representing an event. One or more event notifications are emitted by event publishers and received or retrieved by one or more event subscribers through an event broker.

Basically, publishing can be thought of as broadcasting an event. The event type is analogous to a radio station. Applications interested in a particular station subscribe (or tune in to) a specific event type. Just as in radio broadcasting, where all parties involved must agree in advance on a set of possible frequencies, applications must agree in advance on a predetermined format of events. Subscribers specify what they want preferably based on the type of the event and on content of the event. In the preferred embodiment, the system buffers event, so that, even if a publisher is off-line, a subscriber can still retrieve events. Similarly, a publisher can publish events even if a subscriber is off-line.

Figure 1:
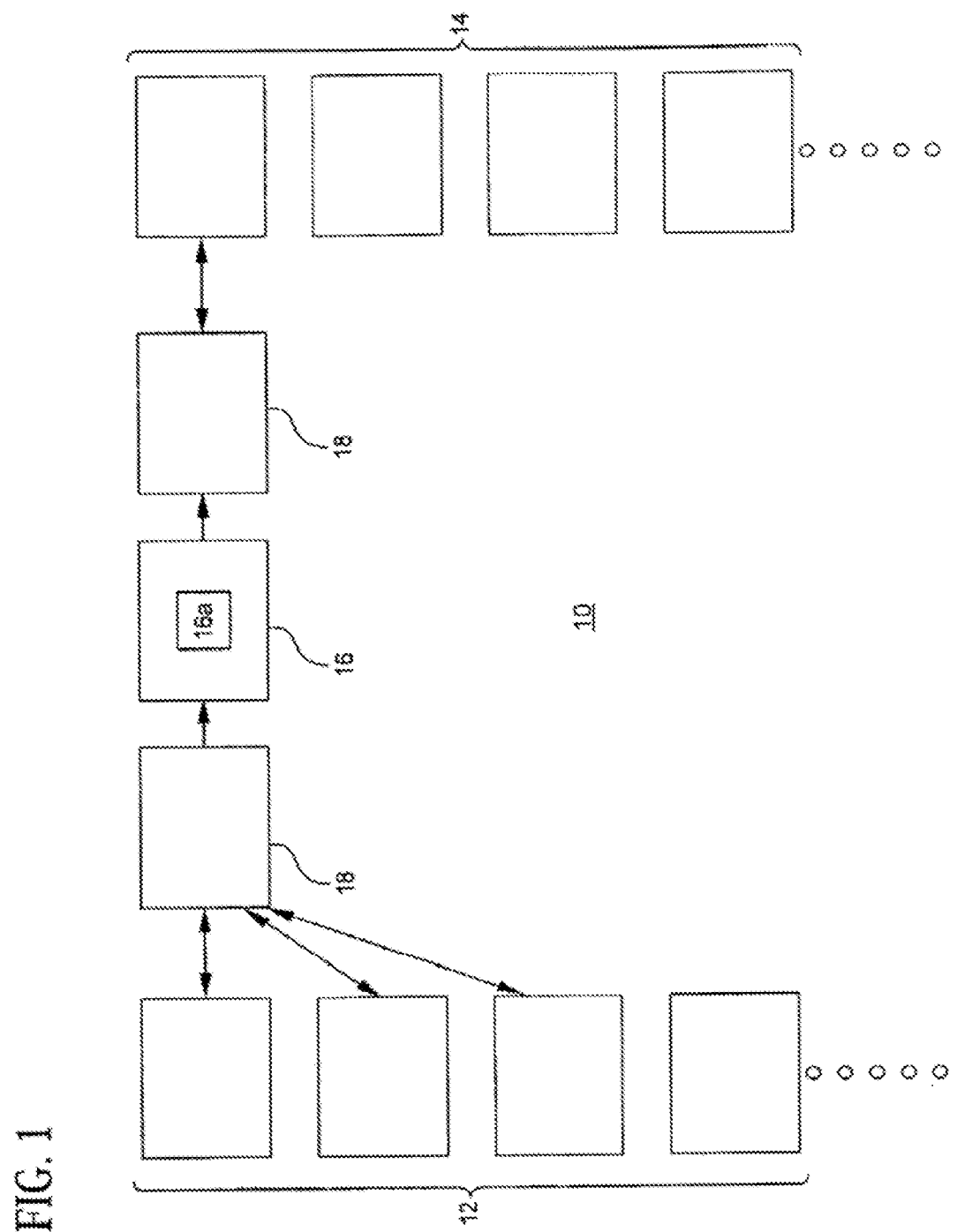
FIG. 1 is a block diagram illustrating publish-subscribe communication system according to the disclosed embodiments.

Referring to FIG. 1, there is shown a block diagram illustrating a publish-subscribe communication system 10 according to an embodiment. The system 10 includes at least one or more event publishers 12 and at least one or more event subscribers 14 connected to an event broker 16. Event Publishers 12 and event subscribers 14 are connected to the broker 16 through respective Web service (WS) servers 18. Each publisher 12, subscriber 14 and WS server 18 of FIG. 1 can be located in a separate server in the same server or in some combination of separate servers and the same server.

According to the disclosed embodiments, an any to any publish and subscribe mechanism for communication for an enterprise is provided. In other words, the event publisher 12 could be a human, or a system or data communication devices such as pagers, cell phones, e-mail, etc. Similarly, the event subscriber 14 could preferably be a human, or a system or data communication devices. So, there are many different ways to communicate between the publisher and a subscriber. The event broker 16 is a web server infrastructure including a database 16a. So any appropriate communications protocol can be utilized to implement the disclosed embodiments.

According to one embodiment, a push only model of delivering event notifications from the event publisher 12 to the event subscriber 14 is implemented. The event notifications are pushed to the event broker 16, whereupon the event broker 16 pushes the event notifications to the event subscriber 14. Even though the disclosed embodiments are fully described in terms of the push-push model, it is understood that other event notification models may also be implemented within the context of the disclosed embodiments, such as pull-pull, pull-push, or push-pull.

In the described embodiment, the event publisher 12 publishes one or more events of certain types to the event broker or web server infrastructure 16 and the event subscriber 14 subscribes to events of certain types. The event publisher 12 and the event subscriber 14 operate asynchronously and are unaware of each other's existence.

In computer operations, asynchronous operation means that a process operates independently of other processes. In the present application, the publisher 12 and the subscriber 14 operate independently of each other. The publisher 12 will publish events without knowing anything about the subscriber 14 and will continue to publish events without receiving any response whether the event has been received by the subscriber 14. Similarly, subscriber 14 will continue to subscribe for the events without knowing of publisher 12's existence and without acknowledging receipt of event.

The described embodiment includes a Web Service Application Programming Interface (API) for publishers 12 and for subscribers 14. The API defines a plurality of procedures that allow respective publishers 12 and subscribers 14 to interface to the web server infrastructure 16. Thus, various types of publishers 12 and subscribers 14 can be connected to the web server infrastructure 16, as long as they use the interface procedures defined in accordance with the API.

The described embodiment also includes predefined routines in the Web Service API which are available to the publisher 12 and the subscriber 14 to perform various functions. An example of a Web Service API routines available to the event publisher 12 for event registration is shown below:

Web Service API for Event Registration
publishEventTypeReq (i.e., Register Event Type)
modifyEventTypeReq
deleteEventTypeReq
authorizeSubscribersReq As seen in the above example, the event publisher 12 has various options on the types of events for registration. The publisher 12 can publish a new event, modify an existing event or delete an existing event. Additionally, the publisher 12 can optionally authorize a subscriber to receive the event.

An example of the Web Service API available to the event broker 16 for Event Discovery is shown below:

Web Service API For Event Discovery
listEventTypesReq
listEventTypesByPublisherReq
listEventTypesBySubscriberReq
getEventTypeByPartialNameReq
getEventTypeByNameReq
getSubscribersReq The event broker 16 exhibits the events in several ways. The event broker 16 can preferably list all events, or list events based on the publishers 12, or list events based on the subscribers 14. Additionally, the event broker 16 can preferably obtain events by the name of the event or via a partial name of the event. The event broker 16 may also obtain the list of subscribers for each of the exhibited events.

Furthermore, a Web Service API for event subscription is also available to the event subscriber 14. An example of such API is shown below:

Web Service API for Event Subscription
subscribe ToEventTypeReq
deleteSubscriberReq
modifySubscriberReq
addSubscriberUsersReq
modifySubscriberUsersReq
deleteSubscriberUsersReq As seen in the above example, the event subscriber 14 may preferably subscribe to an event, may remove itself as a subscriber for an event or even modify the formats available to the subscribers for event subscription. Similarly, the API routines further allow to add subscriber users (humans), modify subscriber users or even delete subscriber users.

Finally, a Web Service API available to the event publisher 12 for event submission is to publish the event as shown below:

Web Service API for Event Submission
publishEvent

Figure 2:
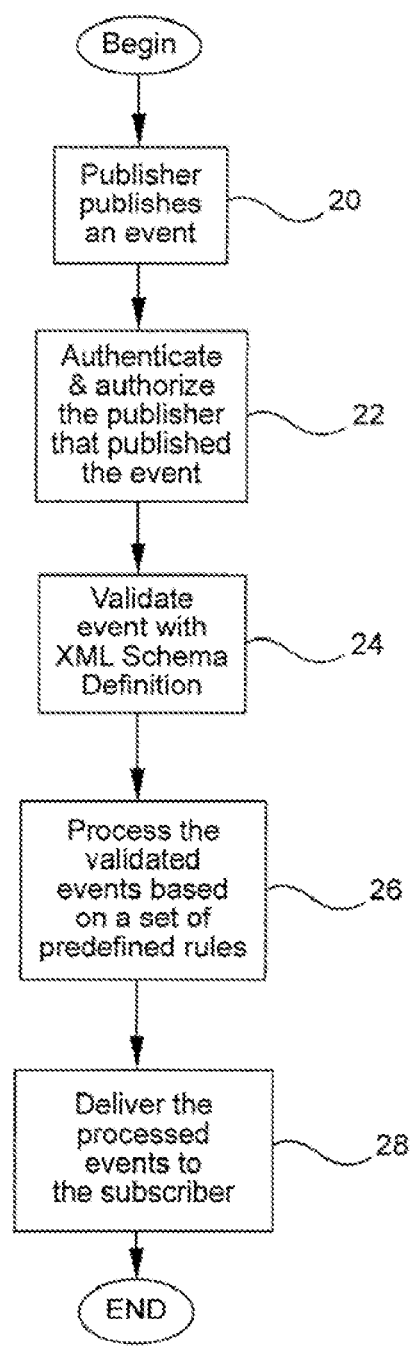
FIG. 2 is a process flow diagram illustrating an event from an event publisher to an event subscriber.

Referring to the flow diagram of FIG. 2, described herein is a process flow of event from the event publisher 12 to an event subscriber 14. The event publisher 12 first registers itself with the event broker 16 to which it is connected to prior to publishing an event. This registration process includes the event broker 16 authorizing the event publisher 12 and creating a service for that publisher 12 in the infrastructure. The event broker 16 may also preferably create priority for the publisher and/or the service for that publisher. The highest priority in the infrastructure is when the publisher may publish an event and the broker will stop other functions and process that event first. The event broker 16 provides an event structure for registration to the event publisher 12. A typical example of an event structure for registration is shown below.

Event Structure for Registration
Name Space:—targetNameSpace of the Event
Name:—Name of the Event
Description:—Description of the Event
Metadata:—Actual Event XML Schema definition
Publisher:—Name of the publisher system from OSIRIS
Priority:—priority of Event Similarly, the subscriber 14 also registers itself with the event broker 16 to which it is connected to prior to receiving an event. This registration process includes the broker 16 authorizing the subscriber 14 to receive the service they want to subscribe to. A typical example of registration data structure for the subscriber 14 is shown below.

Subscriber Registration Data Structure
Event Name Space:—targetNameSpace of the Event
Event Name:—Name of the Event
Subscriber Name:—Name of the subscriber system from OSIRIS
URI:—Web Service Event Listener WSDL URI
Start Date:—Subscription Start Date
End Date:—Subscription End Date
Filter:—XPath expression which evaluates to Boolean value to filter the events
Human User Information (Optional, supports more than one user)
  First Name
  Last Name
  Middle Name
  HRID
  E-Mail ID
  Pager E-Mail Each subscriber 14 is assigned to a particular domain and priorities are given to the subscribers based on the domain to which the subscribers belong. Basically events are categorized into domains so there is no security issue as to whether the subscribers are to receive certain events. So the subscriber has to declare the domain to which the subscriber belongs in order to validate the authenticity of the subscriber and give the subscriber permission to access the event.

In the example of the process flow diagram shown in FIG. 2, a system is the event publisher 12 which needs to be invoked using a web source. So, the event publisher 12 publishes an event using the web server 18 at step 20. A typical example of a published event structure is shown below.

Event Structure (i.e., Published Event Structure)
Event Name Space:—targetNameSpace of the Event
Event Name:—Name of the Event
Event Data:—Actual events XML data The event broker 16 which is on a web service server infrastructure is programmed to listen for events of different types for that event publisher 12. Upon receipt of the event, via the web server 18, the broker 16 at step 22 authenticates and authorizes the publisher 12 that sent the event. In other words, the event broker 16 checks to see if the event publisher 12 who sent the event is registered or not, is the publisher still valid, or has the publisher's registration time expired. The event broker 16 checks the IDs of the publishers to cross-reference against the IDs already registered by the publishers for communication. For security reasons, the publishers are not allowed to change their IDs. Other miscellaneous issues include checking to see if the event is published in the same machine or not. Upon authenticating and authorizing of the publisher, the next step 24 is to validate Event with its XML Schema Definition. The event received by the event broker 16 is checked to see if it is coming in the structure format already set up by the publisher for that event. There are certain generic schemas created on the infrastructure which are flexible enough to deal with n number of scenarios. The event publishers 12 can freely choose one of the generic schemas to publish the events. However, there is an option for any event publisher 12 to publish their own XML. That is, an application could deposit its own structure schema for all the events it publishes and the broker stores this structure format for that event publisher 12. So, the event broker 16 measures and compares all events coming from that event publisher 12 to the schema given by that event publisher 12 or to the generic schema created by the event broker 16.

Upon completion of the validation process, the events that are considered to be legitimate are kept persistent by the event broker 16. Once the events are validated, the event broker 16 would never lose the event if the servers go down or even crash. In other words, these events are fully secured by the event broker 16. Then at step 26, the events are processed by the event broker 16. At this time, the event broker 16 will check the database specifying rules to be evaluated before delivery of the associated events occurs. Such rules may contain database access language expressions such as, for example JMS, SQL and/or PL/SQL statements (or other ANSI/ISO-compliant language expressions, for example) to access the events message's properties, history and content. Alternatively, the rules may include a procedure (written in PL/SQL, for example) that calls an external procedure or function written in another programming language, such as the C programming language, for example. In this manner, even though a subscriber may have subscribed and registered to receive an event, delivery of the associated event may not occur until the rules specified in the database are applied. As the event is tightly integrated with the database, the full functionality native to the database is brought to bear upon the generation and delivery of data and/or system events to the subscribers. The database 16a will include rules on how to manage the events, such as which subscribers 14 will be receiving which events, and how the events will be queued for delivery, and what communications means will be used to deliver these events, as well as other rules.

Moreover, the rules may preferably include that a particular published event never expires on the infrastructure. On the contrary, the rule may include a publisher's request to expire an event in 24 hours and it becomes irrelevant. Then the event broker 16 configures those events to expire in 24. Or, preferably the rule may include a publisher's request for a delivery of event to a certain set of subscribers to receive, and to retry until the subscribers receive the event. Such events are put in a round robin queue, and they won't expire until they are received by the subscriber. The rule may also preferably include a request from the publisher for an acknowledgment of the receipt of the event.

Queues may be stored in queue tables within the database 16a of the event broker 16. A queue table is a database table that contains one or more queues preferably for the order of delivering the events. Some of the orders of delivery of events include, last in first out (LIFO) event, priority of the event, expiry date of the event, or a random order. All of these order of delivery of events will require queuing and will be stored in the queue table with the corresponding event. However, the order of delivery including first in first out (FIFO) will not require queuing of the events at the event broker.

The event broker 16 will continue to manage the queue until the events are delivered to the subscriber 14 via the web server 18 one at a time. The events will be eventually queued according to the rules applied in the database. The event may preferably need to be broadcasted to several destinations. This step includes forcing or pushing the event out to be delivered to one or more destinations. This feature is well known as "push only", in which the events are pushed out for delivery to the communications devices, not the communications devices coming and taking the events. Although not shown, an "event pull" implementation may alternatively be applied for delivery of the events. This requires queuing of the events at the event broker 16 on behalf of the event subscriber 14. The next step 28 is to deliver the queued events to the communications devices one at a time. One such delivery mechanism may preferably be sending event notification to the event subscriber 14 via a web service. In this case, the event subscriber 14 who may have subscribed for an event may preferably upload a web service to receive published events. Another delivery mechanism may preferably include sending event notification to the event subscriber 14 via an e-mail server to Outlook, blackberry, etc. Still another means to send event notification to the event subscriber 14 is through a various numeric and/or alphanumeric pager. The event broker 16 is intelligent enough to realize the limitations of the pagers and the blackberry and may need to reduce the size of the events sent to these communication devices.

The disclosed embodiments provide a system and a method for migrating data from legacy software applications to universal applications. The system includes a migration platform for handling extraction of needed data, transformation and data mapping to the target or universal infrastructure. The migration platform includes tables for reporting the data received from the legacy platform and further mixing and matching the data in accordance with the needs of the universal platform. The migration platform also provides a real time reporting to track the progress of the migration.

The invention claimed is:

1. A method comprising:
    registering, by a processing device of an event publisher, with an event broker for creating an event publishing service on a web server infrastructure for the event publisher;
    receiving, by the processing device of the event publisher, a priority from the event broker, wherein the priority is based on an identity of the event publisher or the event publishing service; and
    sending, by the processing device of the event publisher, an event comprising a format to be published in an extensible markup language schema, wherein the event publisher is associated with a first domain, and at least one subscriber for the event is associated with a second domain, wherein the first domain is different from the second domain, wherein the event is expected to be processed in accordance with the priority by the event broker.

2. The method of claim 1, wherein the registering authorizes the event publisher to publish the event.

3. The method of claim 1, wherein the at least one subscriber comprises a registered subscriber for the event.

4. The method of claim 1, wherein the event contains an expiration time period associated with the event.

5. The method of claim 1, wherein a notification of the event is asynchronously delivered to the at least one subscriber.

6. The method of claim 1, wherein the priority comprises a highest priority such that upon receipt of the event by the event broker, the event broker will stop other functions and process the event first.

7. The method of claim 1, wherein the event further comprises an event type.

8. The method of claim 1, wherein the event further comprises an authorization associated with the at least one subscriber.

9. The method of claim 1, wherein the event further comprises a request for an acknowledgement to be received from the at least one subscriber.

10. The method of claim 1, wherein the event further comprises a number of retry attempts to be made to ensure the event is delivered to the at least one subscriber.

11. The method of claim 1, further comprising:
    sending, by the processing device of the event publisher, a request to modify the event.

12. The method of claim 1, further comprising:
    sending, by the processing device of the event publisher, a request to delete the event.

13. A system comprising:
    a processing device of an event publisher; and
    a computer-readable device storing instructions that, when executed by the processing device, cause the processing device to perform operations, the operations comprising:
        registering with an event broker for creating an event publishing service on a web server infrastructure for the event publisher;
        receiving a priority from the event broker, wherein the priority is based on an identity of the event publisher or the event publishing service; and
        sending an event comprising a format to be published in an extensible markup language schema, wherein the event publisher is associated with a first domain, and at least one subscriber for the event is associated with a second domain, wherein the first domain is different from the second domain, wherein the event is expected to be processed in accordance with the priority by the event broker.

14. The system of claim 13, wherein the registering authorizes the event publisher to publish the event.

15. The system of claim 13, wherein the at least one subscriber comprises a registered subscriber for the event.

16. The system of claim 13, wherein the event contains an expiration time period associated with the event.

17. The system of claim 13, wherein a notification of the event is asynchronously delivered to the at least one subscriber.

18. The system of claim 13, wherein the priority comprises a highest priority such that upon receipt of the event by the event broker, the event broker will stop other functions and process the event first.

19. The system of claim 13, wherein the event further comprises at least one of: an event type, an authorization associated with the at least one subscriber, a request for an acknowledgement to be received from the at least one subscriber, or a number of retry attempts to be made to ensure the event is delivered to the at least one subscriber.

20. A tangible computer-readable medium storing instructions which, when executed by a processing device of an event publisher, cause the processing device to perform operations, the operations comprising:

registering with an event broker for creating an event publishing service on a web server infrastructure for the event publisher;

receiving a priority from the event broker, wherein the priority is based on an identity of the event publisher or the event publishing service; and sending an event comprising a format to be published in an extensible markup language schema, wherein the event publisher is associated with a first domain, and at least one subscriber for the event is associated with a second domain, wherein the first domain is different from the second domain, wherein the event is expected to be processed in accordance with the priority by the event broker.

* * * * *